United States Patent Office 2,843,609
Patented July 15, 1958

2,843,609

17-ALKENYL AND ALKYNYL DERIVATIVES OF 4-ESTRENE-3,17-DIOL

Frank B. Colton, Chicago, Ill., assignor to G. D. Searle & Co., Chicago, Ill., a corporation of Delaware No Drawing. Application October 10, 1956
Serial No. 615,019

Claims priority, application Canada October 11, 1955

7 Claims. (Cl. 260—397.5)

The present invention relates to a new group of highly active hormonal agents and, more particularly, to lower 17-alkenyl and lower 17-alkynyl derivatives of 4-estrene-3,17-diol of the general structural formula

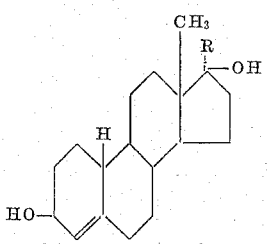

wherein R is a noncyclic unsaturated aliphatic hydrocarbon radical e. g. a lower alkenyl radical such as vinyl, allyl, crotyl, methallyl, ethallyl, hexenyl or octenyl, or a lower alkynyl radical such as ethynyl, methylethynyl, proparyl, butynyl, pentynyl, and hexynyl.

The compounds of this invention are highly active hormonal, and particularly, luteoid agents. On 3-esterification prolonged progestational activity is obtained.

The compounds which are the subject of this invention are of special utility because they lack side reactions which limit the therapeutic applicability of other progestational agents in many patients. Specifically, in therapeutic dosage these compounds do not have the effects of the male sex hormones to a significant degree.

The compounds of this invention, in addition to being useful in the pharmaceutical and veterinary fields, are likewise useful as intermediates in organic synthesis. Thus, catalytic hydrogenation converts these alkenyl and alkynyl derivatives to the 17-alkyl-4-estrene-3,17-diols which have a group of valuable hormonal activities, especially as anabolic agents.

The compounds of the foregoing structural formula can be conveniently prepared by reduction of the corresponding 3-oxo compounds. The reduction can be carried out with reagents which selectively reduce an oxo group without reducing the unsaturated linkage between the carbon atoms. Typically, the Meerwein-Ponndorf-Verley reaction can be used. Especially useful are alkali metal aluminum hydrides and borohydrides such as lithium aluminum hydride and sodium borohydride.

The compounds of this invention can also be prepared advantageously by subjecting 3-hydroxy-4-estren-17-one, or an ester or ether thereof, to reductive alkynylation or alkenylation. Especially useful for this purpose are alkynes or salts thereof with alkali or alkaline earth metals in media such as liquid ammonia, or tertiary alcohols containing alkali metal amides or alcoholates, suitably in inert organic solvents. Useful also are organometallic alkynylating and alkenylating agents such as organolithium compounds and Grignard reagents.

The 3,17-diesters are obtained from the 3,17-diols by conventional procedures. The 3-hydroxy group can be selectively esterified by using one molecular equivalent of acyl halide or anhydride; this method is particularly applicable to the 17-substituted derivatives. 17-monoesters are obtained by the reduction with sodium borohydride or an equivalent reagent of the corresponding esters of 19-nortestosterone or its 17α-substituted derivatives, esterification of the 3-hydroxy group of the resulting monoesters makes available diesters substituted by two different acyl groups.

The compounds and methods of manufacture which constitute this invention will appear more fully from the following examples. In these examples quantities are given in parts by weight and temperatures in degrees centigrade (° C.).

Example 1

To a suspension of 4.3 parts of 19-nortestosterone in 10 parts of benzene and 5.6 parts of dihydropyran there are added, with stirring, 0.0065 part of p-toluene sulfonic acid monohydrate. The mixture is stirred until the reactants dissolve, allowed to stand at room temperature for 5½ hours, then diluted with ether, washed successively with sodium carbonate solution, water, and saturated sodium chloride solution and dried over anhydrous sodium sulfate. The solvent is removed in vacuo. The residue, which is the tetrahydropyranylether of 19-nortestosterone, is dissolved in 100 parts of anhydrous ether and refluxed for 15 minutes with 0.8 part of lithium aluminum hydride. The reaction mixture is cooled to room temperature, the excess lithium aluminum hydride is decomposed by the addition of ethyl acetate and a small amount of ethanol, and water is added dropwise until a slurry of salts separates. The ether layer is decanted, washed with water, and dried over sodium sulfate. The ether is removed in vacuo and the residue is dissolved in 10 parts of pyridine and 11 parts of acetic anhydride and maintained at 70° C. for one hour. Ice is then added and the reaction mixture is stirred for 30 minutes and filtered. The residue is washed with water and taken up in 40 parts of methanol to which 5 parts of 1 molar aqueous hydrochloric acid is added. After standing at room temperature for 30 minutes, 250 parts of water are added and the residue thus precipitated is filtered off, washed and dried to yield 3-acetoxy-4-estrene-17-ol.

To 35 parts of cold pyridine 1.45 parts of chromic oxide are added slowly with stirring and the mixture is allowed to warm to room temperature. Then 1.16 parts of 3-acetoxy-4-estrene-17-ol in 35 parts of pyridine are added and the mixture is stirred for 12 hours, diluted with water and extracted with 600 parts of a 1:1 mixture of ether-benzene. The extract is washed successively with water, 1 molar sulfuric acid solution, water, and finally with saturated sodium chloride solution and then dried over sodium sulfate. The ether is removed in vacuo and the residue is crystallized from methanol-water to yield 3-acetoxy-4-estrene-17-one.

1 part of 3-acetoxy-4-estrene-17-one is dissolved in 20 parts of methanol containing 1.4 parts of potassium hydroxide and the mixture is refluxed for 20 minutes. After cooling to room temperature the mixture is diluted with 150 parts of water and the precipitate thus formed is filtered off, washed with water and dried to yield 3-hydroxy-4-estrene-17-one which exhibits infrared maxima at 2.8, 5.8, and 6.03 microns.

A stirred solution of 10 parts of 3-hydroxy-4-estrene-17-one in 700 parts of anhydrous ether and 45 parts of dry toluene is cooled to 0° C. and saturated with dry acetylene. While a slow stream of acetylene is passed through the reaction mixture, a solution of 20 parts of potassium t-amylate and 135 parts of anhydrous t-amyl alcohol is added in the course of 15 minutes with stirring. Passage of acetylene and stirring are continued for an additional four and one half hours. After standing at 0° C. for 16 hours the mixture is washed with aqueous ammonium chloride solution until the aqueous phase is neutral, then with water and lastly with saturated sodium chloride solution. The organic layer is dried over anhydrous sodium sulfate, filtered and concentrated under vacuum to a residue of about 250 parts. 500 parts of petroleum ether are added and after standing at 0° C. for an hour the mixture is filtered. The collected precipitate is crystallized from aqueous methanol and then from ethyl acetate-petroleum ether to yield 17α-ethynyl-4-estrene-3,17-diol, which melts at about 149–152° C. The substance exhibits no specific absorption in the ultraviolet between 220 and 360 millimicrons. It exhibits infrared maxima at 2.9, 3.1, 6.0, 7.1, 7.2, 7.7, 8.7, 8.8 and 9.1 microns.

Example 2

A mixture of 3 parts of 17α-ethynyl-19-nortestosterone, 3 parts of sodium borohydride and 160 parts of methanol is maintained at room temperature for 20 minutes, after which 10 parts of water are added. The mixture is then acidified with acetic acid and slowly diluted with water. Upon chilling a precipitate forms which is recrystallized successively from aqueous methanol and then from a mixture of ethyl acetate and petroleum ether to yield 17α-ethynyl-4-estrene-3,17-diol melting at about 149–152° C. The infrared absorption spectrum of this compound shows maxima at 2.89, 3.08, 6.03, 6.92, 7.12, 7.23, 7.71, 8.29, 8.52, 8.72, 8.82 and 9.08 microns.

Example 3

A mixture of 10.8 parts of 17α-ethynyl-4-estrene-3,17-diol, 300 parts of dioxane, 1000 parts of pyridine and 6 parts of a 5% palladium on calcium carbonate catalyst is shaken in contact with a hydrogen atmosphere until approximately 1 molecular equivalent of hydrogen has been consumed. At this point the hydrogenation is stopped and the catalyst is removed by filtration. The filtrate is concentrated under vacuum to about 100 parts, diluted with 600 parts of ether and washed with normal hydrochloric acid until a Congo red test shows an acidic reaction. The solution is washed successively with water, with 5% sodium bicarbonate solution, again with water and with saturated sodium chloride solution. The ethereal phase is dried over sodium sulfate, concentrated on a steam bath to about 100 parts and diluted with 150 parts of petroleum ether. After storage at 0° C. for 12 hours, the 17-vinyl-4-estrene-3,17-diol thus obtained is collected on a filter, dried and crystallized from a mixture of ethyl acetate and petroleum ether. The infrared absorption spectrum shows maxima at 2.9 and 6.0 microns. The product is also obtained by the reduction of 17-vinyl-19-nortestosterone with sodium borohydride under the conditions of the preceding example.

A mixture of 5 parts of 17α-vinyl-4-estrene-3,17-diol thus obtained, 40 parts of dioxane and 1.5 parts of a 5% palladium on charcoal catalyst is shaken in contact with a hydrogen atmosphere until approximately 1 molecular equivalent of hydrogen has been consumed. The catalyst is removed by filtration, and the filtrate is concentrated to dryness under reduced pressure. Repeated crystallization of the residue from methanol affords 17α-ethyl-4-estrene-3,17-diol showing a double melting point at about 80 and 130° C.

Example 4

A solution of 10 parts of 17α-vinyl-4-estrene-3,17-diol in 40 parts of propionic anhydride and 40 parts of pyridine is heated on a steam bath under nitrogen for 40 minutes and then treated with ice. A solid precipitate is formed which is collected on a filter and crystallized successively from aqueous methanol and petroleum ether to yield 17α-vinyl-3-propionoxy-4-estren-17-ol.

A stream of hydrogen is passed for an hour through a mixture of 1 part of charcoal containing 5% palladium catalyst and 200 parts of dioxane. Then 10 parts of the 17α-vinyl-3-propionoxy-4-estren-17-ol obtained in the above esterification are added in a dioxane solution. The mixture is shaken until approximately one molecular equivalent of hydrogen has been absorbed. The catalyst is removed by filtration and the filtrate is concentrated to dryness under reduced pressure. Successive crystallization from aqueous methanol and petroleum ether leaves 17α-ethyl-3-propionoxy-4-estren-17-ol which melts at about 87–88° C.

Example 5

A trace amount of iodine is added to a mixture of 1.7 parts of magnesium and 18 parts of ether. All of the ether is removed by distillation and the magnesium is covered with a fresh portion of 70 parts of ether. A solution of 9 parts of allyl bromide in 70 parts of ether is slowly added to the stirred reaction mixture after which a solution of 2 parts of 3-hydroxy-4-estrene-17-one in 70 parts of ether is gradually added. The reaction mixture is heated under reflux for an additional hour and then a solution of 10 parts of sodium potassium tartrate in 100 parts of water is cautiously added with efficient stirring. The ethereal layer is separated, washed with water, dried over sodium sulfate and filtered. The residue obtained by concentration of the filtrate is crystallized from a mixture of ether and methanol, yielding 17α-allyl-4-estrene-3,17-diol. The compound exhibits infrared maxima at 2.9 and 6.0 microns.

A mixture of 5 parts of 17α-allyl-4-estrene-3,17-diol, 100 parts of dioxane and 1.5 parts of 5% palladium on carbon catalyst is shaken with hydrogen until approximately 1 molecular equivalent of hydrogen has been consumed. The catalyst is removed by filtration and the filtrate is concentrated under reduced pressure. The residue is crystallized repeatedly from a mixture of acetone and petroleum ether to yield 17α-propyl-4-estrene-3,17-diol which exhibits infrared maxima at 2.93 and 6.03 microns but has no specific absorption bands in the ultraviolet region between 220 and 360 millimicrons.

Example 6

A solution of 35 parts of sodium borohydride in 250 parts of methanol is added to a solution of 56 parts of 17α-allyl-19-nortestosterone in 400 parts of methanol. The mixture is kept at room temperature for 30 minutes, diluted with 10 parts of water and rendered weakly acid by addition of acetic acid. On further dilution with water and chilling a precipitate is formed which is collected on a filter and recrystallized from aqueous methanol and a mixture of acetone and petroleum ether. The infrared spectrum of the 17α-allyl-4-estrene-3,17-diol thus obtained in the form of a mixture of epimers shows maxima at 2.9 and 6.0 microns.

Example 7

To 1.7 parts of magnesium turnings covered with 100 parts of ether there are added 6.5 parts of crotyl bromide. After the reaction begins 5 additional parts of crotyl bromide and 35 parts of ether are added, followed by 2 parts of 3-hydroxy-4-estrene-17-one dissolved in 75 parts of ether. The reaction mixture is refluxed for 90 minutes and then stirred for 15 hours at room temperature. The reaction mixture is washed successively with aqueous sodium potassium tartrate solution, water and saturated sodium chloride solution. The mixture is dried over sodium sulfate and the solvent is removed in vacuo. The residue is purified by chromatography over 200 parts of silica gel. The column is developed with benzene solutions containing increasing concentrations of ethyl acetate. Elution with a 30% solution yields the 17α-crotyl-4-estrene-3,17-diol which exhibits maxima in the infrared at 2.9 and 6.0 microns.

Example 8

A stirred mixture of 5.7 parts of 3-hydroxy-4-estren-17-one in 300 parts of liquid ammonia and 2 parts of sodamide is treated with 5 parts 1-hexyne. Stirring is continued for three hours and then the mixture is treated with 6 parts of powdered ammonium chloride. After standing at about 25° C. until most of the ammonia has escaped, ether and water are added. The ether layer is separated, washed with water, dried over anhydrous magnesium sulfate, filtered and concentrated under vacuum. The residue is crystallized from a mixture of ether and methanol. The 17-(1-hexynyl)-4-estrene-3,17-diol thus obtained shows infrared maxima at approximately 2.9 and 6.0 microns. The compound has the structural formula

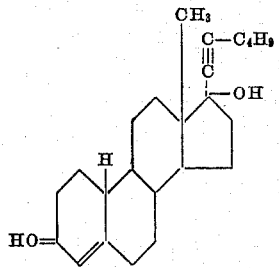

What is claimed is:
1. A member of the class consisting of 17α-(lower alkenyl)-4-estrene-3,17-diol and 17α-(lower alkynyl)-4-estrene-3,17-diol.
2. 17α-(lower alkenyl)-4-estrene-3,17-diol.
3. 17α-vinyl-4-estrene-3,17-diol.
4. 17α-allyl-4-estrene-3,17-diol.
5. 17α-crotyl-4-estrene-3,17-diol.
6. 17α-(lower alkynyl)-4-estrene-3,17-diol.
7. 17α-ethynyl-4-estrene-3,17-diol.

References Cited in the file of this patent
UNITED STATES PATENTS

| | | |
|---|---|---|
| 2,311,067 | Miescher et al. | Feb. 16, 1943 |
| 2,374,369 | Miescher et al. | Apr. 24, 1945 |
| 2,374,370 | Miescher et al. | Apr. 24, 1945 |
| 2,576,311 | Schlesinger et al. | Nov. 27, 1951 |
| 2,739,974 | Colton et al. | Mar. 27, 1956 |
| 2,759,951 | Djerassi et al. | Aug. 21, 1956 |

OTHER REFERENCES

Sandoval et al.: JACS, vol. 77, pp. 148–151, January 5, 1955.